2,900,335

OIL WELL DRILLING MUD

George T. Bravos, Chicago, Ill., and James W. Evans, Highland, Ind., assignors to American Maize-Products Company, a corporation of Maine No Drawing. Application June 13, 1956
Serial No. 591,014

3 Claims. (Cl. 252—8.5)

This invention relates to oil well drilling muds.

In drilling oil wells a mud-like fluid including pregelatinized starch and a colloidal clay is circulated in the bore hole to carry cuttings out of the hole and cool the drill. For this purpose the drilling fluid must have certain physical characteristics and most important of these is the viscosity and water holding characteristics of the fluid. Viscosity and water holding characteristics of the drilling fluid are to a large extent determined by the starch and it has heretofore been customary to use the more expensive starches such as modified waxy maize, potato and tapioca starches. The inexpensive cereal starches have not been used to any great extent because they do not have the required viscosity and water holding characteristics of the more expensive starches.

The present invention is based upon our discovery that when ordinary cereal starch is treated under certain prescribed conditions with a small amount of a water soluble alkaline earth metal salt, the viscosity and water holding characteristics of the cereal starch is so changed that it is entirely satisfactory in oil well drilling fluids and the treated cereal starch has been shown to give better performance than the more expensive starches now in use. Broadly speaking in carrying out the present invention cereal starch granules in aqueous suspension containing about 10 to 45% by weight of starch solids are cooked and pasted in the presence of about 0.1 to 3.0% of a water soluble alkaline earth metal salt such as magnesium or calcium chloride and then after the starch granules are pasted the slurry is dried on steam heated rolls to give a starch product having less than about 15% moisture content by weight. The step of drying the cereal starch down to less than about 15% moisture content by weight is important and when this is done the resulting gelatinized cereal starch will upon rehydration give a paste having exceptionally high viscosity and water holding capacity. In actual tests, Brookfield viscosity at the end of one minute ranged from about 156 poises to about 367 poises at 68° F. and in the so called "wall test" the water loss from an oil well drilling fluid was below about 12.5 mls.

In carrying out the reaction of the present invention the concentration of starch solids in the slurry is an important consideration. With starch slurries containing between about 20 to 45% by weight of starch granules it is necessary to cook and thoroughly paste the starch granules in water before the slurry is dried on steam heated rolls. If a starch slurry containing 20 to 45% by weight of starch solids is fed directly to the steam heated rolls before the granules are cooked and pasted in water then the starch will not have the desired water holding capacity. On the other hand, with a starch slurry containing less than about 20% starch solids by weight the slurry need not be precooked and it may be fed directly to the steam heated rolls and dried to 15% moisture content by weight. Slurries with less than 20% by weight starch solids take somewhat longer to dry and it is believed that in such case the starch granules are in fact pasted in water in the presence of the salt before the starch is dried to 15% moisture content. Heating and drying the starch slurry is preferably carried out on steam heated rolls but other heating and drying systems may be employed.

As to temperature, the starch is cooked and pasted in water at a temperature of about 175° F. to 212° F. as is customary in the art for pasting starch. Lower temperatures may be employed but the cooking time will increase in proportion to the drop in temperature. The temperature of the rolls is generally maintained in the neighborhood of about 290° F. which is also customary in the art for hot rolling starch.

Any of the water soluble alkaline earth metal salts may be used especially magnesium, calcium and barium chlorides but best results have been achieved with magnesium and calcium chlorides which are preferred. Only very small amounts of salt are necessary in our process and we prefer to use between about 0.1% and 3.0% of salt by weight of starch solids in the slurry. Additional amounts of salt may be used but this is just a waste of reagent and it does not improve the viscosity or water holding characteristics of the treated starch product.

As to the starch, any of the known cereal starches such as those derived from corn, wheat, sorghum, etc., may be used in carrying out the present invention. Although we do not now know the exact mechanism of the way in which the alkaline earth metal salts are effective in changing the viscosity and water holding capacity of cereal starches it may well be that the salt in some way weakens the hydrogen bonds of the starch molecules to increase the viscosity and water holding capacity of the starch. On the other hand the salts may react with fatty acids present in cereal starches to form water insoluble soaps and thereby prevent the fatty acids from adversely influencing the viscosity and water holding characteristics of the cereal starches. Whatever the true explanation may be, it is a fact that the water soluble alkaline metal salts are effective in changing the viscosity and water holding capacity of pasted cereal starches so that the paste performs as well or even better than the more expensive starches ordinarily used in oil well drilling fluids.

The following specific examples are given to further illustrate the present invention. Unless otherwise specified parts and percentages are calculated on a weight basis.

*Example 1*

400 parts of ordinary corn starch were slurried in 618 parts of water and 2.8 parts of calcium chloride were added. The mixture was cooked at 202° F. until the starch granules were pasted and the slurry was then dried on steam heated rolls to a moisture content of less than about 15% by weight. The dried treated starch was finely ground and packaged for shipment.

*Examples 2 through 5*

The same procedure, ingredients, and proportions of ingredients were used as in Example 1 with the following amounts of salt substituted in place of the 2.8 parts of calcium chloride specified in Example 1.

| Example: | Calcium chloride, parts |
|---|---|
| 2 | 2.0 |
| 3 | 4.0 |
| 4 | 6.0 |
| 5 | 0.4 |

*Example 6*

The same procedure, ingredients, and proportions of ingredients were used as specified in Example 1 except wheat starch was substituted for corn starch and barium chloride was substituted for calcium chloride.

*Example 7*

The same procedure, ingredients, and proportions of ingredients as specified in Example 1 were used except starch granules derived from sorghum were substituted in place of corn starch and magnesium chloride was substituted in place of calcium chloride.

*Example 8*

The same procedure, ingredients and proportions of ingredients as specified in Example 1 were used except barium chloride was substituted for calcium chloride.

*Example 9*

150 parts of ordinary corn starch were slurried in 850 parts of water and 1.5 parts of calcium chloride were added. The mixture was fed to the hot rolls as specified in Example 1 but without any precooking and the slurry dried to 12% by weight moisture content.

*Example 10*

The viscosity characteristics of the products produced in Examples 1 through 5 were tested on a Brookfield viscosimeter with a No. 4 spindle operated at 12 r.p.m. with 10.0% by weight of pregelatinized starch solids in aqueous liquid held at 68° F. Brookfield readings are expressed in poises.

| Sample of Example | Brookfield Reading | | | |
|---|---|---|---|---|
| | 1 min. | 3 min. | 5 min. | 15 min. |
| 1 | 36.7 | 49.5 | 50.0 | (¹) |
| 2 | 34.0 | 45.9 | 49.8 | 50.0 |
| 3 | 29.7 | 40.6 | 40.3 | 39.9 |
| 4 | 30.9 | 41.2 | 43.2 | 44.1 |
| 5 | 15.6 | 18.0 | 18.7 | 19.0 |
| Control: | | | | |
| Pasted corn starch—no salt treatment | 5.3 | 8.1 | 9.4 | 9.9 |
| Modified waxy corn starch—no salt treatment | 34.3 | 46.5 | 48.2 | 50.0 |

¹ Too viscous to record.

*Example 11*

The water holding characteristics of the products of Examples 1 through 5 and 9 tested in an oil well drilling fluid in accordance with established procedure gave the following results:

A drilling fluid was prepared by adding 4275 mls. of saturated salt (NaCl) solution at room temperature to 225 g. salt gel (Attapulgus mud). The slurry is mixed and then agitated at high speed as in a Waring Blendor for 10 minutes and allowed to stand for 16 hours before use. Four grams of the starch product to be tested are added to 350 ml. of the drilling fluid and mixed in a Waring Blendor for 60 seconds at high speed. The mixture is then transferred to a Hamilton Beach mixer and mixed for 10 minutes at high speed. The oil well drilling fluid is then placed in a filter cup having a filtration area of 7 square inches. A constant gas pressure of 100 pounds per square inch is applied to the filter cup and the amount of filtrate obtained in 30 minutes is measured and recorded in milliliters. The value is the "water loss" or "wall test" and the smaller the value, the greater the water holding capacity of the starch.

| Treated starch of Example | Wall Test, ml. |
|---|---|
| 1 | 8.5 |
| 2 | 8.8 |
| 3 | 8.2 |
| 4 | 8.0 |
| 5 | 12.5 |
| 9 | 8.2 |
| Control: | |
| Pasted corn starch—no salt treatment | 15.5 |
| Modified waxy corn starch—no salt treatment | 8.1 |
| Waxy corn starch—no salt treatment | 8.6 |

It will be understood that in practice the exact composition of drilling fluids will be different for different drilling operations and each operator uses a particular composition which he believes to be superior. In general the amount of gelatinized starch employed in a drilling fluid will not exceed about 4 to 5% by weight of the drilling fluid. More starch may of course be used but the viscosity of the mud should not exceed that at which it may be conveniently pumped with standard equipment.

*Examples 12 through 16*

The procedure, ingredients, and proportions of ingredients of Example 3 were used in these examples with the exception that the starch slurry contained the following percentages of starch solids by weight of slurry. Wall tests were made as described in Example 11 with the following results:

| Example | Percent by weight starch solids in slurry | Wall Test ml. |
|---|---|---|
| 12 | 20.5 | 8.5 |
| 13 | 25.0 | 8.8 |
| 14 | 34.0 | 8.2 |
| 15 | 39.3 | 8.2 |
| 16 | 45.2 | 11.5 |

For the purpose of illustration the present invention has been described in connection with the preparation of oil well drilling muds but it will be understood that the viscosity and water holding characteristics of the treated corn starch make the product valuable in the paper industry in sizing operations and in certain cases in the food industry as a substitute for the more expensive starches currently in use.

It will be understood that it is intended to cover all changes and modifications of the preferred form of the invention herein chosen for the purpose of illustration which do not constitute departures from the spirit and scope of the invention.

What we claim is:

1. An oil well drilling fluid comprising an aqueous suspension of colloidal clay and pregelatinized cereal starch which starch is the dried product of pasting cereal starch granules in aqueous slurry containing about 10% to 45% by weight of starch solids and about 0.1% to 3.0% of a water soluble alkaline earth metal salt by weight of the starch granules, said dried starch product having a water holding capacity equivalent to a "wall test" of less than 12.5 ml. water loss and being present in the drilling fluid in an amount sufficient to increase the water holding capacity of the fluid.

2. In the art of drilling wells, the process which comprises circulating an aqueous drilling fluid containing clay and pregelatinized cereal starch in the bore hole to carry cuttings from the hole, such starch being present in amount sufficient to increase the water holding capacity of the fluid and being the dried product produced by gelatinizing cereal starch granules in aqueous slurry containing about 10 to 45% by weight of starch solids and about 0.1 to 3.0% of a water soluble alkaline earth metal salt based on the weight of starch solids in the slurry, said dried starch product having a water holding capacity equivalent to a "wall test" of less than 12.5 ml. water loss whereby in circulating the starch containing aqueous drilling fluid the amount of water lost from the fluid in the hole is reduced.

3. The method specified in claim 2 in which the water soluble alkaline earth metal salt is selected from the group consisting of calcium chloride, magnesium chloride and barium chloride.

References Cited in the file of this patent

UNITED STATES PATENTS

| | | |
|---|---|---|
| 1,939,236 | Stokes | Dec. 12, 1933 |
| 2,417,307 | Larsen | Mar. 11, 1947 |
| 2,508,533 | Olsen | May 23, 1950 |
| 2,514,055 | Hansen | July 4, 1950 |
| 2,600,404 | Hoeppel | June 17, 1952 |
| 2,658,035 | Bode | Nov. 3, 1953 |

OTHER REFERENCES

Radley: Starch and Its Derivatives, 2nd ed., 1944, D. Van Nostrand Co. N.Y., pages 273 and 274.